(12) United States Patent
Nagata et al.

(10) Patent No.: US 8,089,517 B2
(45) Date of Patent: Jan. 3, 2012

(54) IMAGE STABILIZATION CONTROL CIRCUIT

(75) Inventors: Yasunori Nagata, Hashima (JP); Yasuhisa Yamada, Ame-gun (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 463 days.

(21) Appl. No.: 12/314,989

(22) Filed: Dec. 19, 2008

(65) Prior Publication Data

US 2009/0160953 A1   Jun. 25, 2009

(30) Foreign Application Priority Data

Dec. 25, 2007 (JP) ................................ 2007-331831

(51) Int. Cl.
*H04N 5/228* (2006.01)
(52) U.S. Cl. .............. 348/208.2; 348/208.99; 348/208.3
(58) Field of Classification Search .................. None
See application file for complete search history.

(56) References Cited

U.S. PATENT DOCUMENTS

| | | | |
|---|---|---|---|
| 6,278,842 B1 * | 8/2001 | Yamazaki et al. | 396/55 |
| 6,630,950 B1 * | 10/2003 | Ohkawara et al. | 348/208.12 |
| 6,775,476 B2 * | 8/2004 | Uchida | 396/55 |
| 6,778,768 B2 * | 8/2004 | Ohkawara et al. | 396/55 |
| 6,982,746 B1 * | 1/2006 | Kawahara | 348/208.99 |
| 7,330,408 B2 * | 2/2008 | Sergey et al. | 369/47.17 |
| 2003/0118335 A1 * | 6/2003 | Uchida | 396/55 |
| 2004/0052513 A1 * | 3/2004 | Ohkawara et al. | 396/55 |
| 2005/0201741 A1 * | 9/2005 | Moriya | 396/53 |
| 2005/0254805 A1 * | 11/2005 | Moriya et al. | 396/53 |
| 2007/0166021 A1 * | 7/2007 | Yamazaki | 396/55 |
| 2010/0074605 A1 * | 3/2010 | Washisu | 396/53 |

FOREIGN PATENT DOCUMENTS

JP       A-10-213832       8/1998

* cited by examiner

*Primary Examiner* — Lin Ye
*Assistant Examiner* — John H Morehead, III
(74) *Attorney, Agent, or Firm* — Oliff & Berridge, PLC

(57) ABSTRACT

In an image stabilization control circuit of an image-capturing device, a gyro-equalizer (24) is used to integrate an angular velocity signal corresponding to vibration, and determine a required magnitude of displacement of a lens. The gyro-equalizer (24) integrates the angular velocity signal from a gyro-sensor (12) using an integration circuit (46) (LPF), and converts the result into an angular signal. A direct-current component of the angular signal is removed using a centering circuit (52) (HPF). Excessive phase delay of the angular signal on a high-frequency side caused by a phase characteristic of the gyro-sensor (12) is compensated by a phase lead compensation circuit (50) composed of a high-boost filter, and the phase delay of the angular signal with respect to the angular velocity signal is brought nearer to 90° by an integration process.

6 Claims, 4 Drawing Sheets

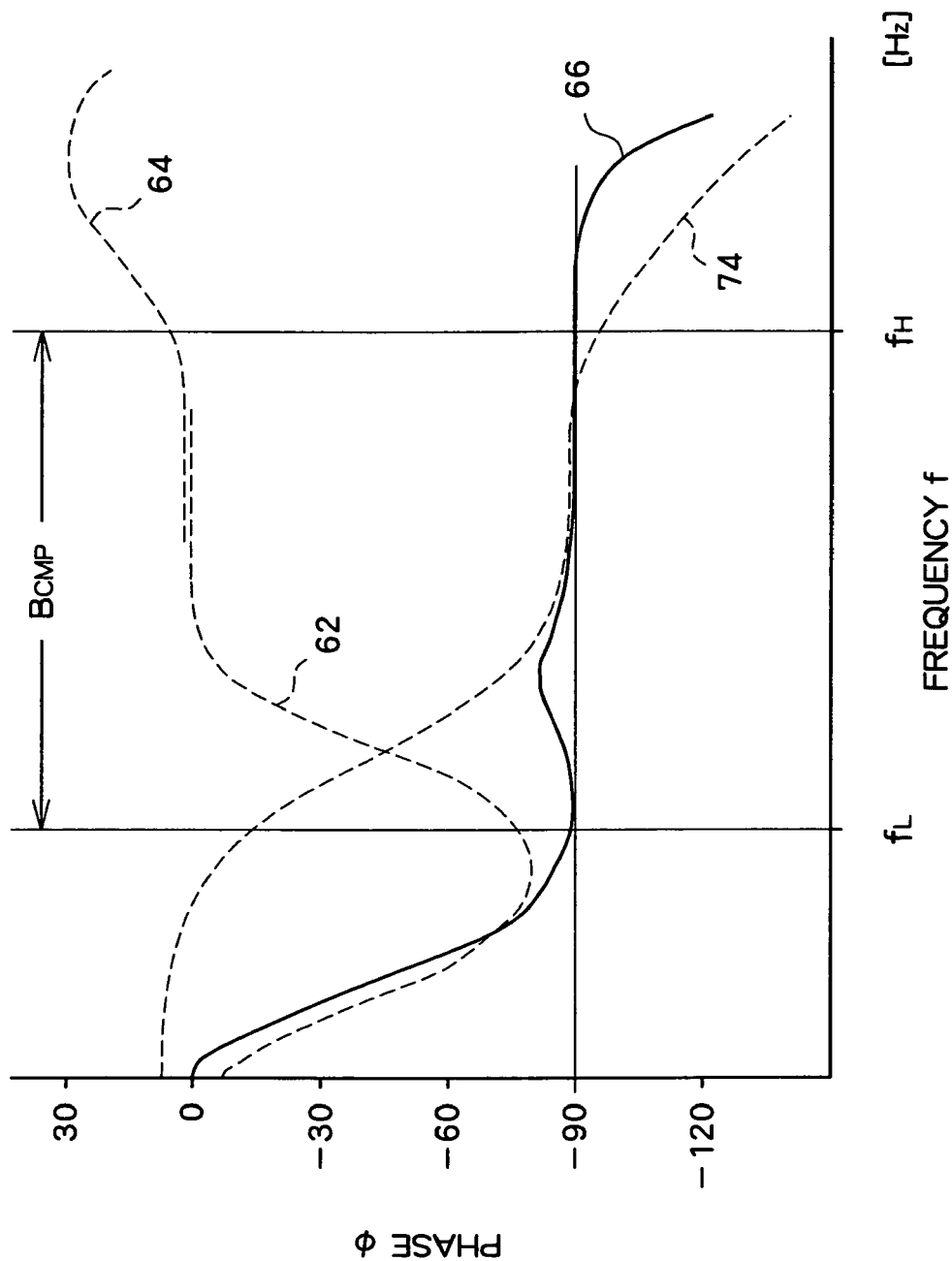

IMAGE STABILIZATION CONTROL CIRCUIT

CROSS-REFERENCE TO RELATED APPLICATION

The priority application number JP 2007-331831 upon which this patent application is based is hereby incorporated by reference.

BACKGROUND OF THE INVENTION

1. Field of the Invention

The present invention relates to an image stabilization control circuit for driving an image stabilization mechanism provided in order to compensate for camera shake or other vibration in an image-capturing device such as a digital still camera.

2. Description of the Prior Art(s)

Contemporary image-capturing devices are often provided with camera shake correction functions in order to suppress a decline in picture quality due to camera shake. Many types of camera shake correction methods exist. In one of the methods, vibration in the image-capturing device is detected by a vibration-detection element, and an optical component such as a correction lens, or an imaging element such as a CCD image sensor is displaced by an actuator on the basis of the detected signal. The vibration-detection element employs a gyro-sensor and detects angular velocity that corresponds to the change in the direction of the optical axis. The displacement magnitude of the lens or the like is used to controllably drive the actuator. Therefore, the image stabilization control circuit for generating the driving signal of the actuator performs a process in which the angular velocity or other type of displacement velocity obtained from the vibration-detection element is integrated and converted to the displacement magnitude.

More particularly, the process for obtaining the displacement magnitude subjects the angular velocity signal outputted from the gyro-sensor to a camera shake component extraction process to remove a frequency component below the region of camera shake vibration frequencies, and converts the angular velocity into an angle-dependent displacement magnitude by integration. In the process for obtaining the displacement magnitude, by damping the output signal of the integration process or by other means, a centering process is also performed to establish the displacement magnitude so that it is made more difficult for the lens or the like to reach the movability limit. As used herein, the phrase "a processor for generating the vibration-compensating signal that corresponds to the displacement magnitude on the basis of the output signal of the gyro-sensor" is referred to as a gyro-equalizer.

Heretofore, gyro-equalizers have been implemented by software for which a microprocessor is used. In this case, a high processing rate is required for the image stabilization control circuit, and the microprocessor must be able to operate with a high speed clock. For instance, in the event that an imaging device is capturing 30 image frames per second to obtain moving images, it is necessary for the lens position to follow a vibration with a speed greater than $1/30^{th}$ of a second.

Power consumption increases in the image stabilization control circuit in the event that a microprocessor is driven using a high speed clock. An image-capturing device carrying an image stabilization control circuit is driven by a secondary battery such as a lithium battery as a power source. Therefore, as the power consumption of the image stabilization control circuit is increased, the secondary battery depletes more rapidly, and the drive time of the image-capturing device is reduced. In other words, a problem arises in which the time for capturing moving pictures is reduced, and the number of capturing still images decreases. Because the camera shake correction function in an image-capturing device often operates not only when capturing moving pictures or still images but also during preview mode when an image is being prepared, consumption of power by the camera shake correction function should preferably be reduced.

In this case, by implementing a gyro-equalizer with a filter circuit, the microprocessor can be dispensed with and power consumption can be reduced. More specifically, a camera shake component extraction process can be configured using a high frequency pass filter (high pass filter, or HPF). It is possible to perform an integration process by using a low frequency pass filter (low pass filter, or LPF). It is also possible to perform a centering process by using an HPF and removing the direct-current component of the integration process output signal.

In the event that the gyro-equalizer comprises these filter circuits, it is desirable that the phase of the output signal of the gyro-equalizer be 90° delayed from the input signal of the gyro-equalizer. In other words, the accuracy of the integration signal decreases as the phase delay (phase lag) is shifted from 90°, which in turn causes the accuracy of the displacement magnitude to decline and the vibration to be less accurately compensated.

On this point, the output of the gyro-sensor is delayed in phase in the high-frequency region. Problems have been presented in that the phase delay causes the integration process performed by the gyro-equalizer to become less accurate. FIG. 4 shows typical phase characteristics illustrating this problem. FIG. 4 shows a phase characteristic of the gyro-equalizer (phase curve 70), a phase characteristic of the output signal of the gyro-sensor (phase curve 72), and a phase characteristic of the output signal of the gyro-equalizer reflecting the phase characteristic of the output signal of the gyro-sensor (phase curve 74). The horizontal axis corresponds to the frequency f, and the vertical axis corresponds to the phase φ of the output signal in relation to the input signal. In FIG. 4, frequency $f_L$ is the lower limit of the target compensation region $B_{CMP}$, and frequency $f_H$ is the upper limit. FIG. 4 shows that even if it is assumed that the phase characteristic of the gyro-equalizer (phase curve 70) is delayed by 90°, the phase characteristic of the output signal thereof (phase curve 74) will be affected by the phase delay of the output signal of the gyro-sensor (phase curve 72), and will be delayed by even more than 90°.

With vibration arising from camera shake or other coefficients, the output signal of the gyro-equalizer may be weaker on the high-frequency side, but the magnitude of the phase delay of the gyro-sensor increases as the frequency increases. Therefore, cases may arise wherein it is impossible to disregard the effect that the magnitude of phase delay has on the output of the gyro-equalizer. In particular, this effect may become more pronounced in cases where the frequency region in which gyro-sensor phase delay is produced extends into the target compensation region $B_{CMP}$ in which the vibration component to be compensated is assumed to be present.

SUMMARY OF THE INVENTION

The present invention was perfected in order to resolve the aforementioned problems, and provides an image stabilization control circuit capable of minimizing a decline in accuracy of a vibration-compensating signal generated on the basis of an output signal of a gyro-sensor or other vibration-detection element, suitably compensating for the vibration.

The image stabilization control circuit according to the present invention is a circuit for obtaining from a vibration-detection element provided to an image-capturing device a vibration-detection signal corresponding to a movement speed of the image-capturing device, and for driving an image stabilization mechanism of the image-capturing device, the image stabilization control circuit comprising: a vibration-compensating signal generator circuit for performing an integration process on the vibration-detection signal and generating a vibration-compensating signal corresponding to the magnitude of displacement of the image-capturing device; and a servo circuit for generating, on the basis of the vibration-compensating signal, a drive signal for driving the image stabilization mechanism. The vibration-compensating signal generator circuit has a high-pass filter for damping a low-frequency component from the vibration-detection signal, and transmitting a vibration component in a target compensation region; an integration circuit for performing the integration process on the vibration-detection signal that has passed through the high-pass filter; and a phase lead compensation circuit for performing phase lead compensation on a phase delay generated on a high-frequency side of the vibration-detection signal due to a characteristic of the vibration-detection element.

BRIEF DESCRIPTION OF THE DRAWINGS

FIG. 3 is a graph schematically showing the phase characteristics of a gyro-equalizer provided with a phase lag compensation circuit and a phase lead compensation circuit.

DESCRIPTION OF THE PREFERRED EMBODIMENT(S)

Several embodiments of the present invention will be described hereinafter with reference to the accompanying drawings. The present embodiments relate to a camera, and the image stabilization control circuit according to the present invention is used in the camera shake correction function of the camera.

Figure 1:
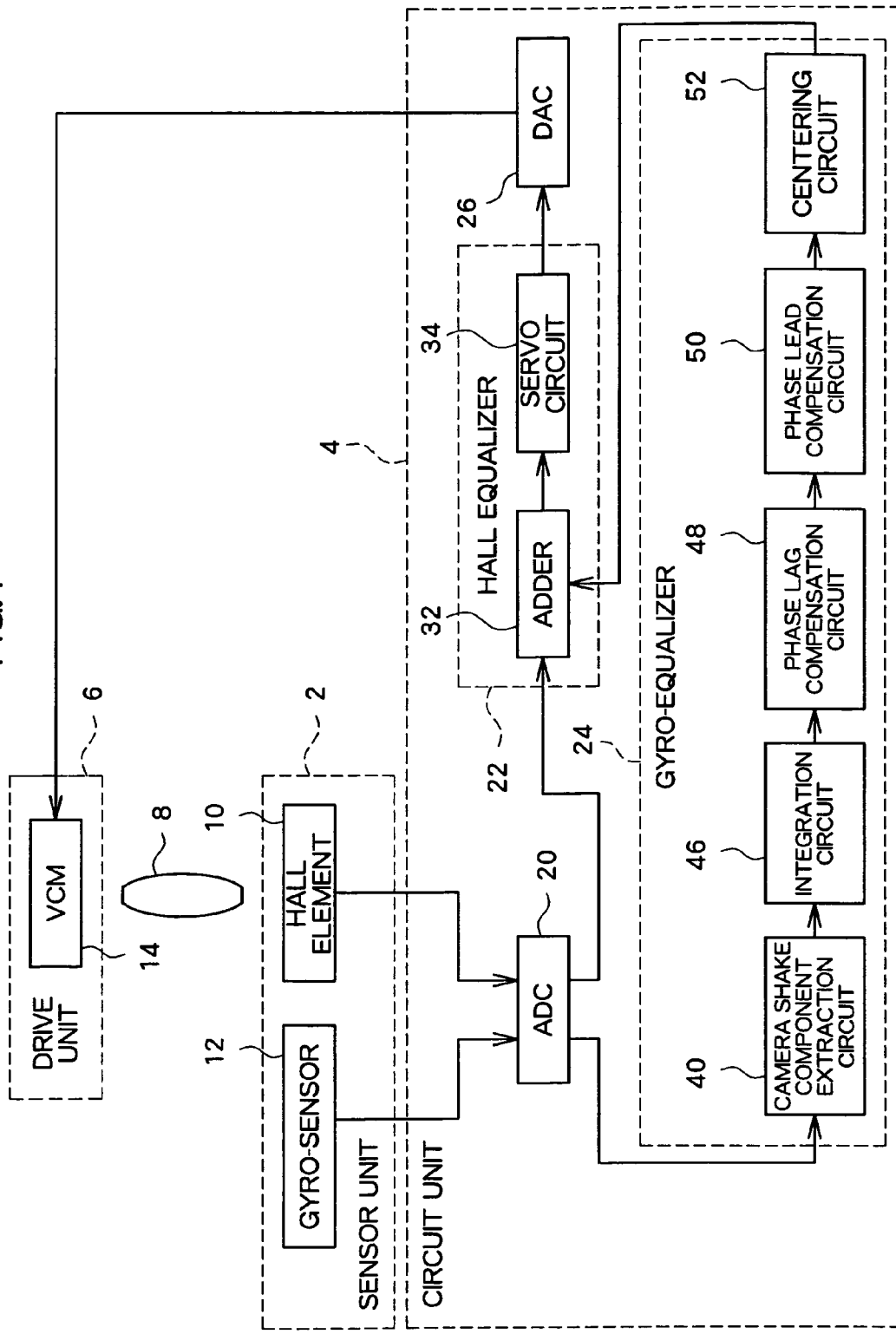
FIG. 1 is a schematic block diagram of an image stabilizing system according to an embodiment of the present invention.

FIG. 1 is a schematic block diagram showing an image stabilizing system according to an embodiment. The image stabilizing system has a sensor unit 2, a circuit unit 4, and a drive unit 6. Several schemes can be used for the image stabilizing system. For example, the present system can operate according to a scheme for controlling the location of a corrective lens (lens 8) provided to an optical system for forming an optical image on a receiving surface of an image pickup element (not shown).

The sensor unit 2 is composed of a Hall element 10 and a gyro-sensor 12. The Hall element 10 is a sensor provided in order to detect a displacement of the lens 8, and the element generates a voltage signal $V_P$ corresponding to the distance to the lens 8 on the basis of the magnetic field of a magnet fixed to the lens 8, and outputs the signal to the circuit unit 4. In order to detect the two-dimensional position ($P_X$, $P_Y$) of the lens 8 within a plane (x-y plane) perpendicular to the optical axis, the Hall element 10 is provided in correspondence with both the x-direction and the y-direction, and the signal $V_P$ can be obtained in each of the x-direction and the y-direction.

The gyro-sensor 12 is a sensor (vibration-detection element) provided in order to detect vibration of a camera, and the sensor presents the circuit unit 4 with a voltage signal $V_\omega$ corresponding to an angular velocity ω as a vibration-detection signal corresponding to the displacement velocity of the camera. Two gyro-sensors 12 are also provided, and these sensors can provide the signal $V_\omega$ both for the angular velocity component around the x-axis and for the angular velocity component around the y-axis.

The displaceable lens 8 and the drive unit 6 for displacing the lens 8 constitute an image stabilization mechanism, and the drive power source of the drive unit 6 is composed of, for example, a voice coil motor (VCM) 14. The VCM 14 linearly displaces the VCM-constituting moveable coil and controls the position of the lens 8 in accordance with the voltage of the drive signal generated by the circuit unit 4. In order to implement two-dimensional displacement within the x-y plane, a pair of VCMs 14 is provided, allowing displacement to be made both in the x-direction and in the y-direction.

The circuit unit 4 has an A/D converter (ADC; Analog-to-Digital Converter) 20, a Hall equalizer 22, a gyro-equalizer 24, and a D/A converter (DAC; Digital-to-Analog Converter) 26. The circuit unit 4 is composed of logic circuits, and is formed as, for example, an ASIC (Application Specific Integrated Circuit).

The output signals of the Hall element 10 and gyro-sensor 12 are inputted to the ADC 20. The ADC 20 converts the voltage signals $V_P$ outputted by the two Hall elements 10 and the voltage signals $V_\omega$ outputted by the two gyro-sensors 12 into digital data on a time-sharing basis. Each of the signals is periodically converted from analog to digital for each servo control cycle.

Position data $D_P$ generated based on the output of the Hall elements 10 is inputted to the Hall equalizer 22. Angular velocity data $D_\omega$ generated based on the output of the gyro-sensor 12 is inputted to the gyro-equalizer 24.

The gyro-equalizer 24 is a circuit for generating a vibration-compensating signal corresponding to the camera displacement. The equalizer integrates the angular velocity $D_\omega$ inputted over a prescribed sampling period in each servo control cycle, and generates data $D_\theta$ corresponding to a vibration angle θ of the camera around the x-axis and y-axis. The gyro-equalizer 24 generates and outputs vibration-compensating data $D_S$ corresponding to the camera shake magnitude in both the x-direction and the y-direction on the basis of the data $D_\theta$. The composition of the gyro-equalizer 24 will be further described below.

The Hall equalizer 22 has an adder 32 and a servo circuit 34. The adder 32 adds positional data $D_P$ inputted from the ADC 20 and vibration-compensating data $D_S$ from the gyro-equalizer 24 separately in the x and y-directions. The servo circuit 34 calculates servo data $D_{SV}$ that corresponds to the required displacement magnitude of the lens 8 from the output data of the adder 32 both in the x-axis direction and in the y-axis direction.

The DAC 26 converts the servo data $D_{SV}$ outputted from the Hall equalizer 22 into an analog voltage signal. The voltage signal outputted by the DAC 26 is subjected to a predetermined amplification process and is applied to the VCM 14. The VCM 14 is driven in the direction in which the absolute value of $D_{SV}$ decreases, the lens 8 in a camera provided with the present system is thereby moved in accordance with the camera shake in the image capture interval, the shake-induced displacement of the subject image on the image element can be compensated, and a high-quality image signal can be obtained.

A description of the structure of the gyro-equalizer 24 will now be provided. The gyro-equalizer 24 has a camera shake component extraction circuit 40, an integration circuit 46, a phase lag compensation circuit 48, a phase lead compensation circuit 50, and a centering circuit 52.

The camera shake component extraction circuit 40 is an HPF, and the circuit is presented with an angular velocity signal composed of temporally sequenced angular velocity data $D_\omega$ from the ADC 20, damps the direct-current component contained in the angular velocity signal, and extracts the high-frequency component of the angular velocity signal reflected by the vibration of the camera. The camera shake component extraction circuit 40 is composed of a digital filter.

The integration circuit 46 integrates the angular velocity signal outputted by the camera shake component extraction circuit 40, and generates an angular signal for expressing the magnitude of displacement of the image-capturing device. The integration circuit 46 is configured using an LPF. The LPF is composed of a digital filter, and the filter characteristics are set depending on a filter coefficient set in a register (not shown). In essence, the phase characteristics of the LPF constituting the integration circuit 46 are preferably set so that a phase delay of 90° with respect to the inputted angular velocity signal can be realized in a target compensation region $B_{CMP}$ for correcting camera shake.

The angular signal obtained from the integration circuit 46 is inputted into the centering circuit 52 via the phase lag compensation circuit 48 and the phase lead compensation circuit 50. The centering circuit 52 performs a process for correcting the displacement magnitude so that the lens 8 will not readily attain the movability limit according to an image stabilization mechanism. One centering technique is a method for damping a component that is considered to be direct-current and has a frequency lower than the lower limit $f_L$ of the target compensation region $B_{CMP}$, from the angular signal obtained by integration. In this case, the centering circuit 52 can be configured using an HPF. The HPF is composed of a digital filter, and the filter characteristics are set depending on a filter coefficient set in a register (not shown). In essence, the cutoff frequency $f_C$ of the HPF constituting the centering circuit 52 is set below the lower limit $f_L$ of the target compensation region $B_{CMP}$. In addition, the phase characteristics are preferably set so that the phase advance (phase lead) of the HPF as generated in the low-frequency region does not encroach into the region $B_{CMP}$.

The frequency characteristic of either the integration circuit 46 or the centering circuit 52 is taken into account so that the compensation-control signal outputted from the gyro-equalizer 24 will be a signal corresponding to a suitable integration result of the angular velocity in the target compensation region $B_{CMP}$; however, this is not readily accomplished. One main reason for this is the problem described above; i.e., that the phase of the output signal of the gyro-sensor 12 is delayed on the high-frequency side, and the phase delay increases along with an increase in frequency. In the present invention, the gyro-equalizer 24 is provided with a phase lead compensation circuit 50 to address this problem. The phase lead compensation circuit 50 can be composed of a digital filter.

Figure 2A:
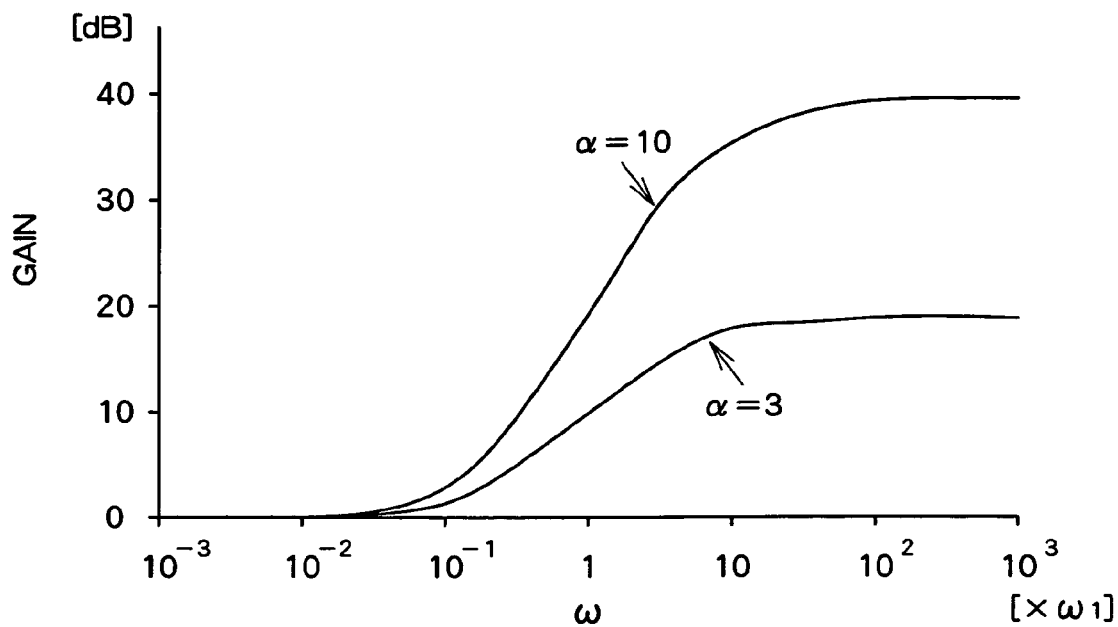
FIGS. 2A and 2B are schematic Bode diagrams of ordinary phase lead compensation elements.
Figure 2B:
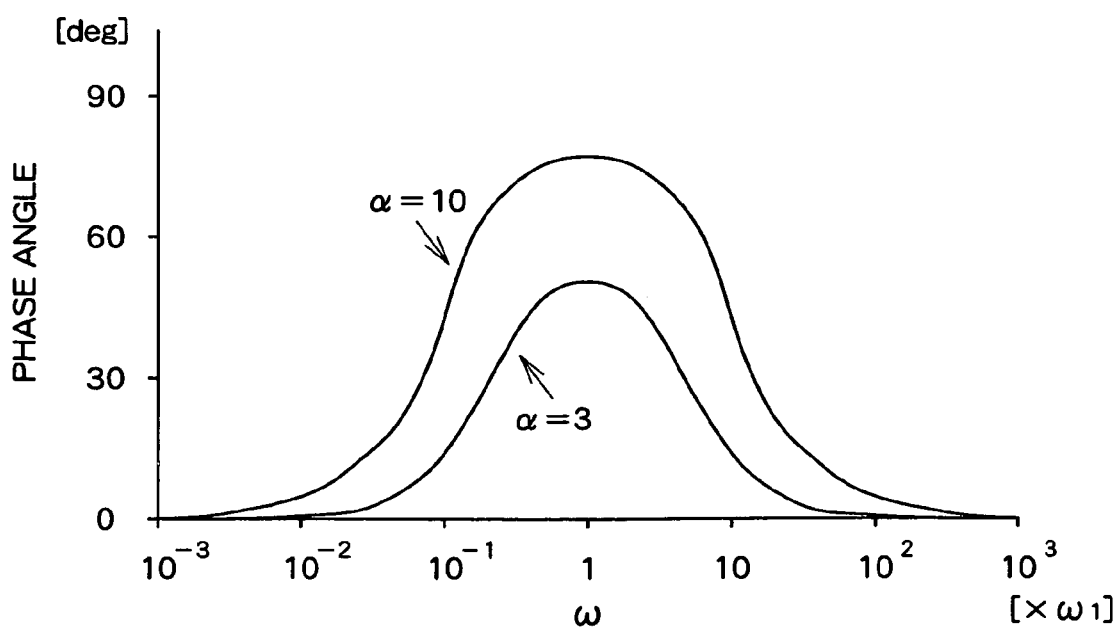

The phase lead compensation circuit 50 provides a phase-advance in a particular frequency region to the integration signal inputted from the integration circuit 46 via the phase lag compensation circuit 48, and sends an output to the centering circuit 52. FIGS. 2A and 2B are schematic Bode diagrams of an ordinary phase lead compensation element. FIG. 2A shows a gain characteristic, and FIG. 2B shows a phase characteristic. Such phase lead compensation elements may, for example, be provided with the bilinear transfer function $G_1(s)$ below.

$$G_1(s)=K_1(\alpha_1 \cdot s+\omega_1)/\{(1/\alpha_1)s+\omega_1\}$$

In the above equation, s is a Laplace operator. $K_1, \alpha_1, \omega_1$ are parameters, where $\omega_1>0$ and $\alpha_1>1$. In the simple case that $K_1=1$, the gain characteristic of a phase lead compensation element provided by this transfer function is $\alpha$ (20 $\log_{10} \alpha$ [dB]) when the angular frequency of the input signal $\omega_s=\omega_1$, asymptotically approaches $\alpha^2$ (40 $\log_{10} \alpha$ [dB]) on the high-frequency side, and asymptotically approaches 1 (0 [dB]) on the low-frequency side. The phase is defined as the maximum phase-advance angle $\phi_{M1}$ when $\omega_s=\omega_1$, and asymptotically approaches 0 as $\omega_S$ moves away from $\omega_1$ toward the low-frequency side or the high-frequency side. $\phi_{M1}$ is given by the following formula and will be 90°0 or less. $\phi_{M1}$ increases as $\alpha_1$ increases, and the effect of the phase lead compensation will extend to a wider frequency region.

$$\phi_{M1}=\tan^{-1}\{(\alpha_1-1/\alpha_1)/2\}$$

A filter having the phase lead compensation characteristic shown in FIGS. 2A and 2B is referred to as a high-boost filter (HBF) The filter is also referred to as a high-shelf filter (high-shelving filter) because of the shape of the gain characteristic, which results from a shelf-form gain being applied to the high band.

The phase lead compensation circuit 50 is configured using an HBF. The phase lead compensation range and degree are set so that an increase in the phase delay beyond 90°; i.e., an excessive phase delay, as shown on the high-frequency side of the target compensation region $B_{CMP}$ by the phase characteristic of the output signal of the gyro-equalizer in FIG. 4 (phase curve 74) can be compensated for by adjusting $\omega_1$ and $\alpha_1$. It will accordingly be possible for the phase characteristic of the compensation control signal outputted by the gyro-equalizer 24 to be harmonized with a 90° phase delay corresponding to a suitable integration result of the angular velocity on the high-frequency side of the target compensation region $B_{CMP}$, and for the phase characteristic of the 90° phase delay to extend beyond the upper limit $f_H$ of region $B_{CMP}$.

Figure 4:
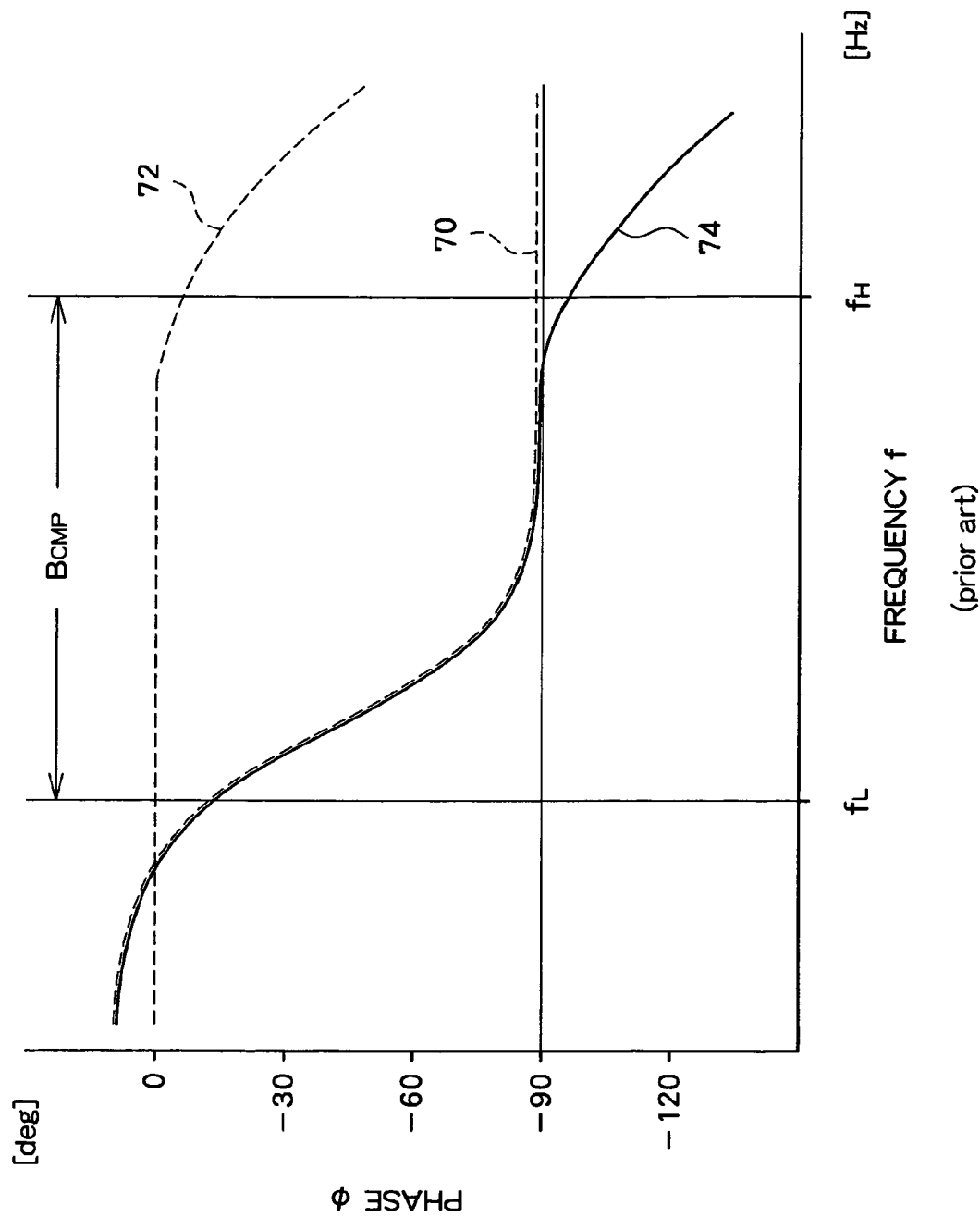
FIG. 4 is a view of schematic phase characteristics showing the problems arising in the output signal of a prior-art gyro-equalizer.

Another issue besides the phase characteristic of the compensation-control signal being shifted from the 90° phase delay in the target compensation region $B_{CMP}$ relates to the phase characteristic of the gyro-equalizer itself. The LPF constituting the integration circuit 46 has a phase characteristic such that there is a delay of 90° in a frequency region higher than the transition region in which the cutoff frequency $f_C$ is located, and a 0° shift in a frequency region lower than the transition region. The HPF constituting the centering circuit 52 has a phase characteristic such that there is a 0° shift in a frequency region higher than the transition region, and an advance of 90° in the lower-frequency region. In a gyro-equalizer using a filter circuit, therefore, the phase delay magnitude falls below 90° in the low-frequency region. The decline in phase delay magnitude; i.e., the insufficient phase delay, can extend into the low-frequency side of the target compensation region $B_{CMP}$ as shown in FIG. 4.

In regard to this issue, the frequency characteristic of the integration circuit 46 or the centering circuit 52 is taken into account, as described above; however, in actual practice, such considerations alone may not be capable of adequately suppressing the spread of the insufficient phase delay into the target compensation region $B_{CMP}$. One possible reason is that, while the lower limit $f_L$ of the target compensation region $B_{CMP}$ can be set to a low frequency of, e.g., several $H_Z$, the phase characteristics of the LPF and HPF as mentioned above have transition regions in the vicinity of the cutoff frequency $f_C$ and change into a comparatively gentle manner.

The fact that the phase characteristic in the target compensation region $B_{CMP}$ moves away from a 90° phase delay as a result of the insufficient phase delay presents the same problem as in the case of excessive phase delay caused by the phase characteristic of the gyro-sensor. In other words, the vibration-compensating signal corresponding to displacement magnitude declines in accuracy, and adequate compensation for the vibration cannot be provided.

Therefore, in order to address the aforementioned problem, the gyro-equalizer 24 is provided with the phase lag compensation circuit 48. The phase lag compensation circuit 48 can be composed of a digital filter. The phase lag compensation circuit 48 provides a phase delay in a particular frequency region to the integration signal inputted from the integration circuit 46, and sends an output to the phase lead compensation circuit 50. Such phase lag compensation elements may, for example, be provided with the bilinear transfer function $G_2(s)$ below.

$$G_2(s) = K_2(s + \alpha_2 \cdot \omega_0)/\{s + (1/\alpha_2)\omega_2\}$$

$K_2$, $\alpha_2$, and $\omega_2$ are parameters, where $\omega_2 > 0$ and $\alpha_2 > 1$. The gain characteristic of the phase lag compensation element provided by this transfer function shows a frequency dependency opposite that of the gain characteristic of $G_1(s)$ above. The phase is defined as the maximum phase delay angle $\phi_{M2}$ when $\omega_S = \omega_2$, and asymptotically approaches 0 as $\omega_S$ moves away from $\omega_2$ toward the low-frequency side or the high-frequency side. $\phi_{M2}$ is given by the following formula and has an absolute value of 90° or less. An increase in $\alpha_2$ is accompanied by an increase in the absolute value of $\phi_{M2}$ and causes the effect of the phase lag compensation to reach a wider frequency region.

$$\phi_{M2} = \tan^{-1}\{(1/\alpha_2 - \alpha_2)/2\}$$

A filter having the above-mentioned phase lag compensation characteristic is referred to as a low-boost filter (LBF). The filter is also referred to as a low-shelf filter (low-shelving filter) because of the shape of the gain characteristic, which results from a shelf-form gain being applied to the low band.

The phase lag compensation circuit 48 is configured using an LBF, and the phase lag compensation range and degree are set so that insufficient phase delay on the low-frequency side of the target compensation region $B_{CMP}$ as shown in FIG. 4 will be compensated for by adjusting $\omega_2$ and $\alpha_2$.

FIG. 3 is a graph schematically showing the phase characteristic of the gyro-equalizer 24 provided with the phase lag compensation circuit 48 and the phase lead compensation circuit 50. FIG. 3 shows the phase characteristic corresponding to phase curve 74 of FIG. 4; i.e., the phase characteristic of the output signal of a gyro-equalizer not having the phase lag compensation circuit 48 or the phase lead compensation circuit 50. FIG. 3 also shows the phase characteristic of the phase lag compensation circuit 48 (phase curve 62) and the phase characteristic of the phase lead compensation circuit 50 (phase curve 64), set corresponding to phase curve 74; and the phase characteristic of the gyro-equalizer 24 provided with the phase lag compensation circuit 48 and the phase lead compensation circuit 50 (phase curve 66).

As can be understood from FIG. 3, providing the phase lead compensation circuit 50 makes it possible to selectively perform phase lead compensation for the frequency region of the excessive phase delay, and bring the phase characteristic of the high-frequency side in the target compensation region $B_{CMP}$ closer to a 90° delay. It is also possible to extend the 90° delay phase characteristic to the high-frequency region beyond the upper limit $f_H$ of the target compensation region $B_{CMP}$.

Providing the phase lag compensation circuit 48 makes it possible to selectively perform phase lag compensation in the frequency region of the insufficient phase delay, and bring the phase characteristic of the low-frequency side in the target compensation region $B_{CMP}$ closer to a 90° delay.

Bringing the phase characteristic nearer to a 90° delay thus makes it possible for a compensation-control signal corresponding to the angle θ obtained by appropriately integrating the angular velocity ω to be obtained from the gyro-equalizer 24.

In a case where the excess phase delay on the high-frequency side cannot be adequately compensated for using only one HBF, an additional HBF with a different $\phi_{M1}$ and degree of phase advance may be added. Also, in the case that using only one LBF results in a region of insufficient phase delay being left in the target compensation region $B_{CMP}$, an additional LBF may be added so that selective phase lag compensation can be performed for that region.

The element for selectively generating a phase advance or a phase delay in a given frequency range essentially serves as a high-shelf filter or a low-shelf filter for generating a gain transition in the frequency range, as can be understood from Bode's theorem. Each of the high-shelf filter and the low-shelf filter may have a bi-quadratic as well as the above-mentioned bi-linear transfer function. Each of the phase lag compensation circuit 48 and the phase lead compensation circuit 50 can comprise a digital filter having a transfer function other than the above bi-linear transfer function.

The phase lag compensation circuit 48 and the phase lead compensation circuit 50 can be provided at any position in the gyro-equalizer 24 downstream of the camera shake component extraction circuit 40. In addition, the order of the phase lag compensation circuit 48 and the phase lead compensation circuit 50 can be reversed. For example, the phase lag compensation circuit 48 and the phase lead compensation circuit 50 can be arranged upstream of the integration circuit 46 or downstream of the centering circuit 52.

An arrangement is adopted in the gyro-equalizer 24 so that a process for generating a compensation control signal from an angular velocity signal is performed by a digital filter. It is accordingly possible to obviate the microprocessor or the like used in order to generate the compensation control signal, and reduce power consumption in the circuit unit 4. Furthermore, an arrangement in which the processing of the gyro-equalizer 24 is performed by a digital filter makes it possible to reduce the circuit surface area to a greater extent that with an arrangement having a microprocessor or the like. It is accordingly possible to reduce the cost of the semiconductor chip on which the circuit unit 4 is formed. Furthermore, the filter coefficient or other adjustment data can easily be changed by having the gyro-equalizer 24 comprise a digital filter. The setting of the adjustment data corresponding to the design of the image-capturing device can thereby be changed with ease.

The embodiment of the present invention is configured such that detection of the position of the lens 8 and driving of the lens 8 are performed by a Hall element 10 and a VCM 14, respectively; however, this embodiment is not provided by way of limitation to the present application. For example, the element for driving the lens 8 can be a stepping motor or a piezoelectric element. In addition, as long as a vibration-detection element generates a phase delay on the high-frequency side in the same manner as the gyro-sensor, then the present invention may also be used in a vibration control circuit of an image-capturing device in which the element is used.

The embodiment of the present invention is based on a lens shift scheme for driving the lens and correcting the camera shake, but is not provided by way of limitation to the present invention. For example, the present invention can also be applied to an image sensor shift scheme for shifting a CCD image sensor or other image-capturing element in accordance with wobble of the image-capturing device. In this case, the position of the image-capturing element is detected by the sensor, and the image-capturing element is displaced by an actuator.

According to the present invention as described above, in a case where the characteristic of a vibration-detection element generates a delay in phase on a high-frequency side, and there is accordingly generated a further phase delay exceeding that of a phase delay state corresponding to an ideal integration process in the output of a vibration-compensating signal generator circuit, a phase lag compensation circuit is used to provide compensation for the excessive phase delay. An angular velocity detected by the vibration-detection element is thereby converted into displacement magnitude in a highly accurate manner, and the accuracy of the vibration-compensating signal corresponding to the displacement magnitude of the image-capturing device is increased. As a result, it is possible to suitably compensate for vibration of the image-capturing device.

What is claimed is:

1. An image stabilization control circuit for obtaining from a vibration-detection element provided to an image-capturing device a vibration-detection signal corresponding to a movement speed of the image-capturing device, and for driving an image stabilization mechanism of the image-capturing device, the image stabilization control circuit comprising:
   a vibration-compensating signal generator circuit for performing an integration process on the vibration-detection signal and generating a vibration-compensating signal corresponding to the magnitude of displacement of the image-capturing device; and
   a servo circuit for generating, on the basis of the vibration-compensating signal, a drive signal for driving the image stabilization mechanism; wherein the vibration-compensating signal generator circuit has:
   a high-pass filter for damping a low-frequency component from the vibration-detection signal, and transmitting a vibration component in a target compensation region;
   an integration circuit for performing the integration process on the vibration-detection signal that has passed through the high-pass filter; and
   a phase lead compensation circuit for performing phase lead compensation on a phase delay generated on a high-frequency side of the vibration-detection signal due to a characteristic of the vibration-detection element wherein the phase lead compensation circuit is configured to compensate for an increase in the phase delay beyond 90 degrees on the high-frequency side of a target compensation region.

2. The image stabilization control circuit of claim 1, wherein:
   the phase lead compensation circuit is a high-boost filter.

3. The image stabilization control circuit of claim 1, wherein:
   the servo circuit generates the drive signal on the basis of a signal obtained by adding a signal corresponding to a drive magnitude of the image stabilization mechanism, and the vibration-compensating signal outputted from the image stabilization mechanism, drive magnitude being obtained from a drive magnitude detector provided to the image-capturing device.

4. The image stabilization control circuit of claim 1, wherein:
   the vibration-compensating signal generator circuit has a centering high-pass filter for damping a direct-current component from an output signal of the integration circuit.

5. The image stabilization control circuit of claim 1, further comprising:
   a register for storing filter coefficients, wherein:
   each of the high-pass filter, the integration circuit, and the phase lead compensation circuit is composed of a digital filter circuit; and
   the digital filter circuit performs a filter operation process in accordance with a filter characteristic set depending on the filter coefficients stored in the register.

6. The image stabilization control circuit of claim 4, further comprising:
   a register for storing filter coefficients, wherein:
   each of the high-pass filter, the integration circuit, the phase lead compensation circuit, and the centering high-pass filter is composed of a digital filter circuit; and
   the digital filter circuit performs a filter operation process in accordance with a filter characteristic set depending on the filter coefficients stored in the register.

* * * * *